US012046184B2

(12) United States Patent
Liu

(10) Patent No.: US 12,046,184 B2
(45) Date of Patent: Jul. 23, 2024

(54) PIXEL CIRCUIT, BACKLIGHT MODULE, AND DISPLAY PANEL

(71) Applicant: TCL CHINA STAR OPTOELECTRONICS TECHNOLOGY CO., LTD., Guangdong (CN)

(72) Inventor: Bin Liu, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/756,046

(22) PCT Filed: Apr. 19, 2022

(86) PCT No.: PCT/CN2022/087664
§ 371 (c)(1),
(2) Date: May 14, 2022

(87) PCT Pub. No.: WO2023/178778
PCT Pub. Date: Aug. 28, 2023

(65) Prior Publication Data

US 2024/0153439 A1 May 9, 2024

(30) Foreign Application Priority Data

Mar. 23, 2022 (CN) ......................... 202210294590.8

(51) Int. Cl.
*G09G 3/32* (2016.01)
*G09G 3/3258* (2016.01)
*G09G 3/34* (2006.01)

(52) U.S. Cl.
CPC ............. *G09G 3/32* (2013.01); *G09G 3/3258* (2013.01); *G09G 3/3406* (2013.01); (Continued)

(58) Field of Classification Search
CPC .. G09G 3/3233; G09G 3/3648; G09G 3/3266; G09G 3/20; G09G 3/36;
(Continued)

(56) References Cited

U.S. PATENT DOCUMENTS

2009/0109150 A1 4/2009 Han et al.
2011/0025671 A1 * 2/2011 Lee ........................ G09G 3/003 345/76
(Continued)

FOREIGN PATENT DOCUMENTS

CN 101996579 A 3/2011
CN 103943070 A 7/2014
(Continued)

OTHER PUBLICATIONS

Korean Office Action issued in corresponding Korean Patent Application No. 10-2022-7021883 dated Sep. 25, 2023, pp. 1-4.
(Continued)

*Primary Examiner* — Dong Hui Liang
(74) *Attorney, Agent, or Firm* — PV IP PC; Wei Te Chung; Zhigang Ma

(57) ABSTRACT

A pixel circuit, a backlight module, and a display panel are provided. The pixel circuit includes a driving unit, a voltage stabilization unit, a coupling unit, a writing unit, and a black insertion unit. One end of the black insertion unit is connected to a control end of the driving unit, the other end of the black insertion unit is connected to a first power line, and a control end of the black insertion unit is connected to a second control line. The driving unit can be turned off in a plurality of different time periods in a light-emitting phase of the pixel circuit, thereby constructing a plurality of unequally divided sub-fields, which can increase a number of grayscales which can be displayed.

20 Claims, 4 Drawing Sheets

(52) U.S. Cl.
CPC ............... *G09G 2300/0426* (2013.01); *G09G 2300/043* (2013.01); *G09G 2310/027* (2013.01); *G09G 2310/062* (2013.01); *G09G 2310/08* (2013.01); *G09G 2320/0233* (2013.01); *G09G 2330/028* (2013.01)

(58) Field of Classification Search
CPC ...... G09G 3/3688; G09G 3/3258; G09G 3/32; G09G 2300/0842; G09G 2300/0819; G09G 2300/0861; G09G 2300/0426; G09G 2320/0261; G09G 2320/0233; G09G 2320/0252; G09G 2320/0257; G09G 2320/0247; G09G 2310/061; G09G 2310/0251; G09G 2310/08; G09G 2310/027
See application file for complete search history.

(56) References Cited

U.S. PATENT DOCUMENTS

| | | | | |
|---|---|---|---|---|
| 2011/0164071 | A1 | 7/2011 | Chung et al. | |
| 2012/0235973 | A1* | 9/2012 | Yoo | G09G 3/3233 345/76 |
| 2021/0158754 | A1 | 5/2021 | Umezawa | |
| 2023/0154403 | A1* | 5/2023 | Kang | H10K 59/1216 345/211 |
| 2023/0419894 | A1* | 12/2023 | Liu | G09G 3/3208 |

FOREIGN PATENT DOCUMENTS

| | | | |
|---|---|---|---|
| CN | 107492336 | A | 12/2017 |
| CN | 112071275 | A | 12/2020 |
| CN | 112785972 | A | 5/2021 |
| CN | 113053297 | A | 6/2021 |
| CN | 113241036 | A | 8/2021 |
| CN | 113593469 | A | 11/2021 |
| KR | 20140033967 | A | 3/2014 |

OTHER PUBLICATIONS

International Search Report in International application No. PCT/CN2022/087664, mailed on Aug. 29, 2022.

Written Opinion of the International Search Authority in International application No. PCT/CN2022/087664, mailed on Aug. 29, 2022.

* cited by examiner

PIXEL CIRCUIT, BACKLIGHT MODULE, AND DISPLAY PANEL

TECHNICAL FIELD

The present disclosure relates to the display technology field, and more particularly to a pixel circuit, a backlight module, and a display panel.

BACKGROUND ART

With the vigorous development of the display industry, people's requirements for display media are getting higher and higher. High contrast, high color saturation, and fast response speed make self-luminous display become one of the main development directions of the industry.

Self-luminous displays are usually implemented with corresponding pixel circuits. The pixel circuits are further divided into an internal compensation type pixel circuit and an external compensation type pixel circuit. When the internal compensation type pixel circuit is driven by pulse width modulation, a number of grayscales which can be implemented is still small. This is difficult to meet the demands for high-quality display.

Technical Problem

The present disclosure provides a pixel circuit, a backlight module, and a display panel for solving the technical problem that a number of grayscales which can be implemented is small.

Technical Solution

In a first aspect, the present disclosure provides a pixel circuit including a driving unit, a voltage stabilization unit, a coupling unit, a writing unit, and a black insertion unit. One end of the voltage stabilization unit is connected to a control end of the driving unit. The other end of the voltage stabilization unit is connected to one end of the driving unit and a first power line. One end of the coupling unit is connected to the control end of the driving unit. One end of the writing unit is connected to the other end of the coupling unit. The other end of the writing unit is connected to a data line. A control end of the writing unit is connected to a first control line. One end of the black insertion unit is connected to the control end of the driving unit. The other end of the black insertion unit is connected to the first power line. A control end of the black insertion unit is connected to a second control line. The black insertion unit is configured to turn off the driving unit during a plurality of different time periods in a light-emitting phase of the pixel circuit.

In some embodiments, the pixel circuit further includes a reset unit. One end of the reset unit is connected to the control end of the driving unit. The other end of the reset unit is connected to a second power line. A control end of the reset unit is connected to a third control line.

In some embodiments, the reset unit includes a reset transistor. One of a source electrode and a drain electrode of the reset transistor is connected to the control end of the driving unit. The other of the source electrode and the drain electrode of the reset transistor is connected to the second power line. A gate electrode of the reset transistor is connected to the third control line.

In some embodiments, the first power line is configured to transmit a first power signal. The second power line is configured to transmit a second power signal. A voltage potential of the first power signal is lower than a voltage potential of the second power signal.

In some embodiments, the pixel circuit further includes a light-emitting unit, a light-emitting control unit, and a compensation unit. One end of the light-emitting unit is connected to the second power line. One end of the light-emitting control unit is connected to the other end of the light-emitting unit. The other end of the light-emitting control unit is connected to the other end of the driving unit. A control end of the light-emitting control unit is connected to a light-emitting control line. One end of the compensation unit is connected to the other end of the driving unit. The other end of the compensation unit is connected to the control end of the driving unit. A control end of the compensation unit is connected to a fourth control line.

In some embodiments, the light-emitting unit includes at least one light-emitting device. An anode of the at least one light-emitting device is connected to the second power line. The light-emitting control unit includes a light-emitting control transistor. One of a source electrode and a drain electrode of the light-emitting control transistor is connected to a cathode of the at least one light-emitting device. The other of the source electrode and the drain electrode of the light-emitting control transistor is connected to the other end of the driving unit. The compensation unit includes a compensation transistor. One of a source electrode and a drain electrode of the compensation transistor is connected to the one end of the reset unit. The other of the source electrode and the drain electrode of the compensation transistor is connected to the other of the source electrode and the drain electrode of the light-emitting control transistor. A gate electrode of the compensation transistor is connected to the fourth control line.

In some embodiments, the black insertion unit includes a black insertion transistor. One of a source electrode and a drain electrode of the black insertion transistor is connected to the control end of the driving unit. The other of the source electrode and the drain electrode of the black insertion transistor is connected to the first power line. A gate electrode of the black insertion transistor is connected to the second control line.

In some embodiments, the driving unit includes a driving transistor. A gate electrode of the driving transistor is connected to the one of the source electrode and the drain electrode of the black insertion transistor, the one end of the voltage stabilization unit, and the one end of the coupling unit. One of a source electrode and a drain electrode of the driving transistor is connected to the first power line. The first power line is configured to transmit a first power signal. When the driving transistor is an N-channel thin film transistor, a voltage potential of the first power signal is a constant voltage low potential. Alternatively, when the driving transistor is a P-channel thin film transistor, the voltage potential of the first power signal is a constant voltage high potential.

In some embodiments, the voltage stabilization unit includes a voltage stabilization capacitor. One end of the voltage stabilization capacitor is connected to the one of the source electrode and the drain electrode of the driving transistor. The other end of the voltage stabilization capacitor is connected to the gate electrode of the driving transistor. The coupling unit includes a coupling capacitor. One end of the coupling capacitor is connected to the gate electrode of the driving transistor. The writing unit includes a writing transistor. One of a source electrode and a drain electrode of the writing transistor is connected to the other end of the coupling capacitor. The other of the source electrode and the drain electrode of the writing transistor is connected to the data line. Agate electrode of the writing transistor is connected to the first control line.

In some embodiments, the first power line is configured to transmit a zero voltage potential signal.

In a second aspect, the present disclosure provides a display panel including a plurality of the pixel circuits in at least one of the above-mentioned embodiments. The pixel circuits are distributed in a matrix in the display panel.

In a third aspect, the present disclosure provides a backlight module including the pixel circuit in at least one of the above-mentioned embodiments.

Advantageous Effects

In the pixel circuit, the backlight module, and the display panel provided by the present embodiment, the one end of the black insertion unit is connected to the control end of the driving unit, the other end of the black insertion unit is connected to the first power line, and the control end of the black insertion unit is connected to the second control line. The driving unit can be turned off in the plurality of different time periods in the light-emitting phase of the pixel circuit, thereby constructing a plurality of unequally divided sub-fields, which can exponentially increase a number of grayscales which can be displayed.

Furthermore, the driving unit and the black insertion unit can share the same first power line. This reduces signal lines required by the pixel circuit, thereby reducing occupied space of a display area and improving an aperture ratio.

Furthermore, since the control end of the driving unit is connected to the one end of the reset unit, the coupling unit, and the voltage stabilization unit, a leakage channel is not easily formed by the coupling unit and the voltage stabilization unit. Furthermore, the other end of the reset unit maintains at a constant voltage high potential. This is easier to maintain a voltage potential at the control end of the driving unit, which is beneficial for improving displayable grayscale accuracy.

DETAILED DESCRIPTION OF EMBODIMENTS

To make the objectives, technical schemes, and technical effects of the present disclosure more clearly and definitely, the present disclosure will be described in detail below by using embodiments in conjunction with the appending drawings. It should be understood that the specific embodiments described herein are merely for explaining the present disclosure but are not intended to limit the present disclosure.

Figure 1:
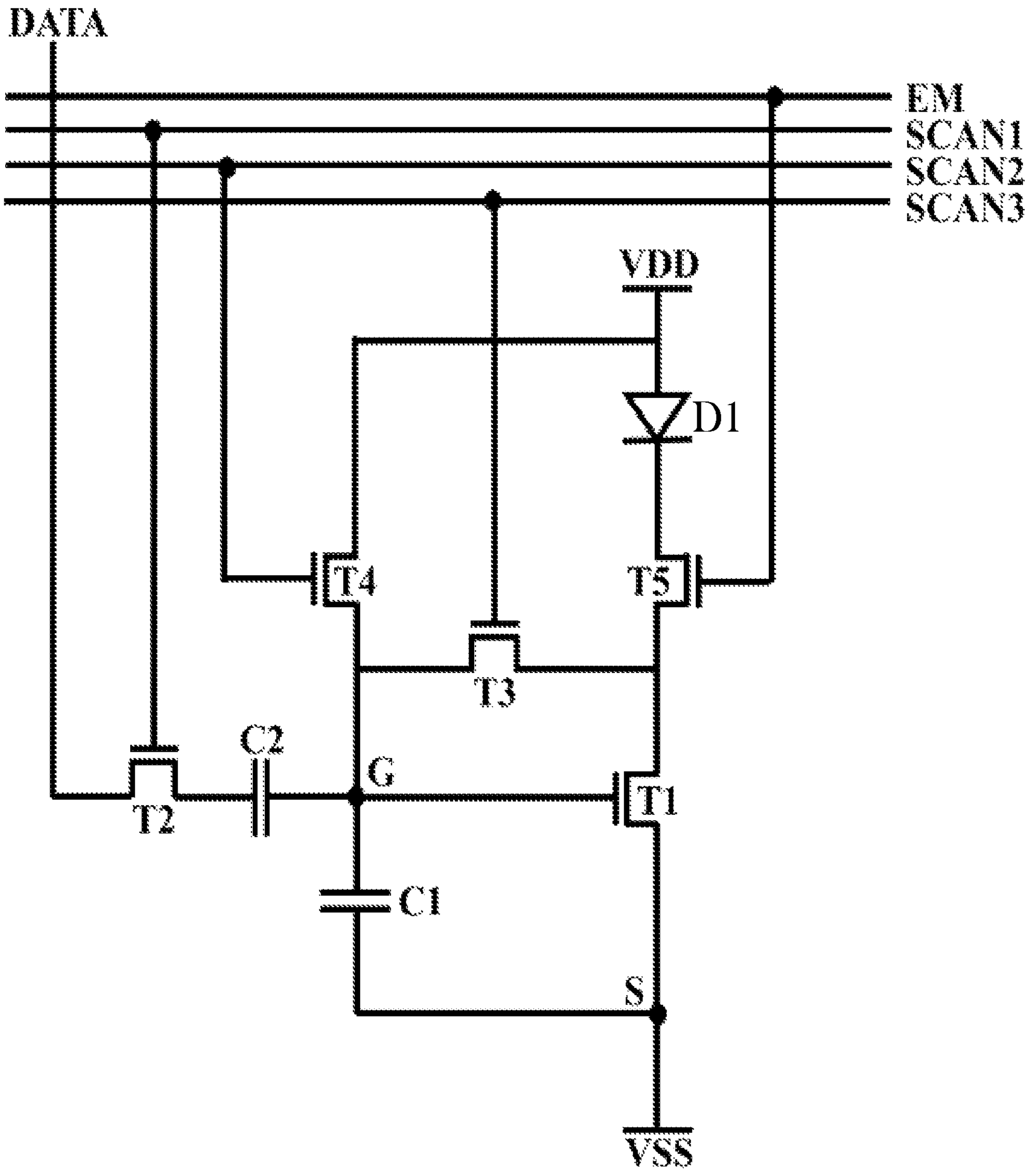
FIG. 1 illustrates a structural schematic diagram of a pixel circuit in the prior art.

As shown in FIG. 1, an internal compensation type pixel circuit is provided in the prior art. The pixel circuit includes a driving transistor T1, a voltage stabilization capacitor C1, a coupling capacitor C2, a writing transistor T2, a reset transistor T4, a compensation transistor T3, a light-emitting control transistor T5, and a light-emitting device D1.

A gate electrode of the drive transistor T1 is connected to one end of the voltage stabilization capacitor C1, one end of the coupling capacitor C2, one of a source electrode and a drain electrode of the reset transistor T4, and one of a source electrode and a drain electrode of the compensation transistor T3. One of a source electrode and a drain electrode of the driving transistor T1 is connected to the other end of the voltage stabilization capacitor C1 and a first power line. The other of the source electrode and the drain electrode of the driving transistor T1 is connected to the other of the source electrode and the drain electrode of the compensation transistor T3 and one of a source electrode and a drain electrode of the light-emitting control transistor T5. The other of the source electrode and the drain electrode of the light-emitting control transistor T5 is connected to a cathode of the light-emitting device D1. An anode of the light-emitting device D1 is connected to the other of the source electrode and the drain electrode of the reset transistor T4 and a second power line. The other end of the coupling capacitor C2 is connected to one of a source electrode and a drain electrode of the writing transistor T2. The other of the source electrode and the drain electrode of the writing transistor T2 is connected to a data line. A gate electrode of the write transistor T2 is connected to a first control line. Agate electrode of the reset transistor T4 is connected to a third control line. A gate electrode of the compensation transistor T3 is connected to a fourth control line. A gate electrode of the light-emitting control transistor T5 is connected to a light-emitting control line.

Based on a display panel including the pixel circuit shown in FIG. 1, the display panel takes a refresh frequency of 240 Hz and 10 lines as an example. It is assumed that detection and compensation of a threshold voltage (Vth) of the driving transistor T1 takes 50 s. The pixel circuit shown in FIG. 1 only can implement an equally divided sub-field driving method based on Pulse Width Modulation (PWM) can be realized. In this situation, 8 grayscales (3 bits) can be implemented.

Figure 2:
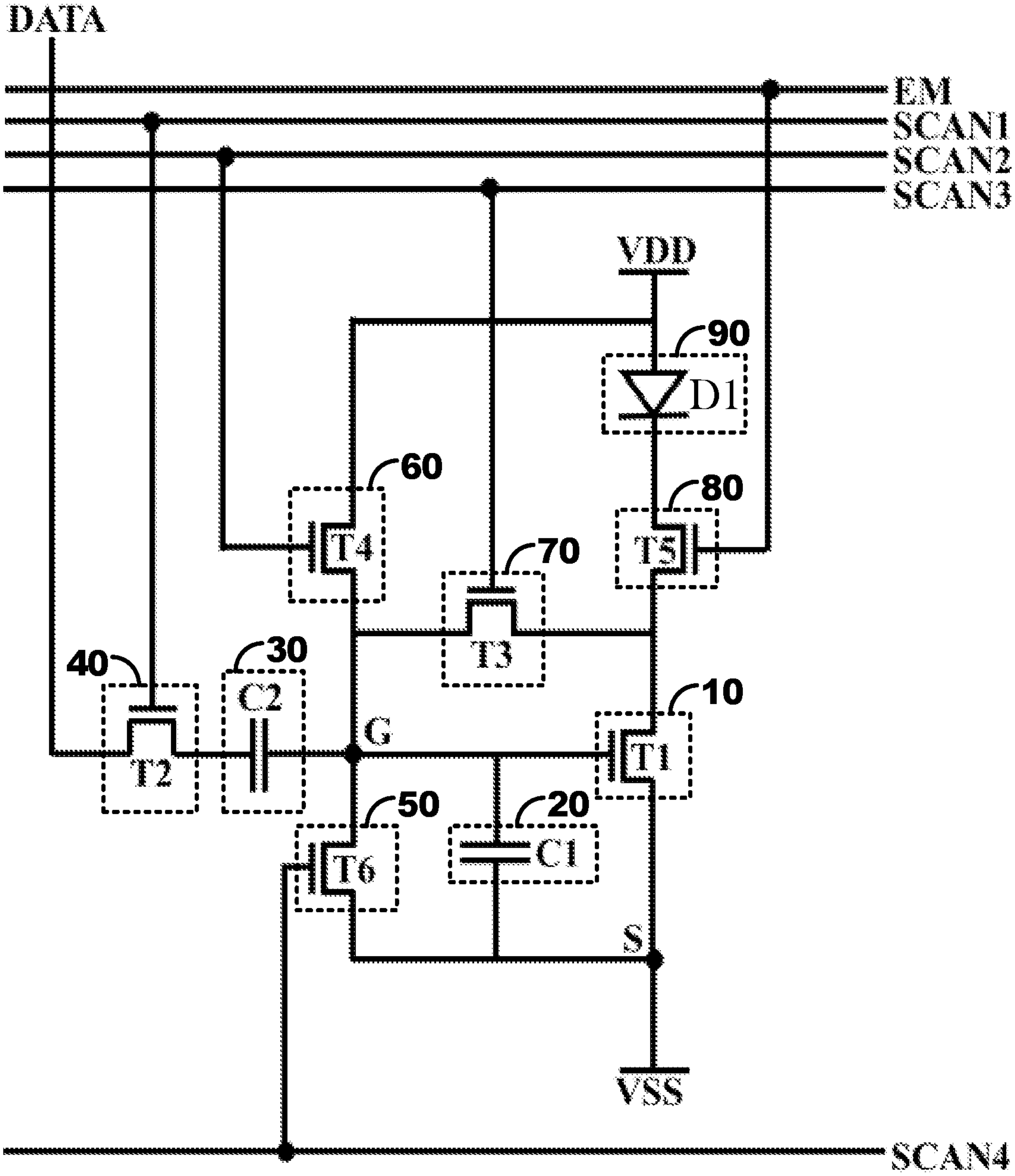
FIG. 2 illustrates a structural schematic diagram of a pixel circuit provided by an embodiment of the present disclosure.

However, with the continuous improvement of display requirements, a number of the grayscales which can be provided by the pixel circuit shown in FIG. 1 is too small. In view of this, an embodiment provides a pixel circuit. As shown in FIG. 2, the pixel circuit includes a driving unit 10, a voltage stabilization unit 20, a coupling unit 30, a writing unit 40, and a black insertion unit 50. One end of the voltage stabilization unit 20 is connected to a control end of the driving unit 10, and the other end of the voltage stabilization unit 20 is connected to one end of the driving unit 10 and a first power line. One end of the coupling unit 30 is connected to the control end of the driving unit 10. One end of the writing unit 40 is connected to the other end of the coupling unit 30, the other end of the writing unit 40 is connected to a data line, and a control end of the writing unit 40 is connected to a first control line. One end of the black insertion unit 50 is connected to the control end of the driving unit 10, the other end of the black insertion unit 50 is connected to the first power line, and a control end of the black insertion unit 50 is connected to a second control line. The black insertion unit 50 is configured to turn off the driving unit 10 during a plurality of different time periods in a light-emitting phase of the pixel circuit.

It can be understood that in the pixel circuit provided by the present embodiment, the one end of the black insertion unit 50 is connected to the control end of the driving unit 10, the other end of the black insertion unit 50 is connected to the first power line, and the control end of the black insertion unit 50 is connected to the second control line. The driving unit 10 can be turned off in the plurality of different time periods in the light-emitting phase of the pixel circuit, thereby constructing a plurality of unequally divided sub-fields, which can exponentially increase a number of gray-scales which can be displayed.

Furthermore, the driving unit 10 and the black insertion unit 50 can share the same first power line. This reduces signal lines required by the pixel circuit, thereby reducing occupied space of a display area and improving an aperture ratio.

In one embodiment, the pixel circuit further includes a reset unit 60. One end of the reset unit 60 is connected to the control end of the driving unit 10, the other end of the reset unit 60 is connected to a second power line, and a control end of the reset unit 60 is connected to a third control line.

It can be understood that since the control end of the driving unit 10 is connected to the one end of the reset unit 60, the coupling unit 30, and the voltage stabilization unit 20, a leakage channel is not easily formed by the coupling unit 30 and the voltage stabilization unit 20. Furthermore, the other end of the reset unit 60 maintains at a constant voltage high potential. This is easier to maintain a voltage potential at the control end of the driving unit 10, which is beneficial for improving displayable grayscale accuracy.

In one embodiment, the reset unit 60 includes a reset transistor T4. One of a source electrode and a drain electrode of the reset transistor T4 is connected to the control end of the driving unit 10, the other of the source electrode and the drain electrode of the reset transistor T4 is connected to the second power line, and a gate electrode of the reset transistor T4 is connected to the third control line.

It should be noted that under control of the third control line, the reset transistor T4 can reset the voltage potential at the control end of the driving unit 10.

In one embodiment, the first power line is configured to transmit a first power signal VSS, the second power line is configured to transmit a second power signal VDD, and a voltage potential of the first power signal VSS is lower than a voltage potential of the second power signal VDD.

It can be understood that the voltage potential of the first power signal VSS can turn off the driving unit 10 to prevent a light-emitting current from flowing through a light-emitting unit 90, which can realize black insertion during a display process.

In one embodiment, the pixel circuit further includes the light-emitting unit 90, a light-emitting control unit 80, and a compensation unit 70. One end of the light-emitting unit 90 is connected to the second power line. One end of the light-emitting control unit 80 is connected to the other end of the light-emitting unit 90. The other end of the light-emitting control unit 80 is connected to the other end of the driving unit 10. A control end of the light-emitting control unit 80 is connected to a light-emitting control line. One end of the compensation unit 70 is connected to the other end of the driving unit 10. The other end of the compensation unit 70 is connected to the control end of the driving unit 10. The control end of the compensation unit 70 is connected to a fourth control line.

In one embodiment, the light-emitting unit 90 includes at least one light-emitting device D1. An anode of the at least one light-emitting device D1 is connected to the second power line.

It should be noted that at least one light-emitting device D1 can be connected in series and/or parallel to each other. Each of the at least one light-emitting device D1 can be one of a Mini-LED, a Micro-LED, an OLED, and a QLED.

In one embodiment, the light-emitting control unit 80 includes a light-emitting control transistor T5. One of a source electrode and a drain electrode of the light-emitting control transistor T5 is connected to a cathode of the at least one light-emitting device D1, and the other of the source electrode and the drain electrode of the light-emitting control transistor T5 is connected to the other end of the driving unit 10.

In one embodiment, the compensation unit 70 includes a compensation transistor T3. One of a source electrode and a drain electrode of the compensation transistor T3 is connected to the one end of the reset unit 60, the other of the source electrode and the drain electrode of the compensation transistor T3 is connected to the other of the source electrode and the drain electrode of the light-emitting control transistor T5, and a gate electrode of the compensation transistor T3 is connected to the fourth control line.

In one embodiment, the black insertion unit 50 includes a black insertion transistor T6. One of a source electrode and a drain electrode of the black insertion transistor T6 is connected to the control end of the driving unit 10, the other of the source electrode and the drain electrode of the black insertion transistor T6 is connected to the first power line, and a gate electrode of the black insertion transistor T6 is connected to the second control line.

In one embodiment, the driving unit 10 includes a driving transistor T1. A gate electrode of the driving transistor T1 is connected to the one of the source electrode and the drain electrode of the black insertion transistor T6, the one end of the voltage stabilization unit 20, and the one end of the coupling unit 30. One of a source electrode and a drain electrode of the driving transistor T1 is connected to the first power line. The first power line is configured to transmit the first power signal VSS. When the driving transistor T1 is an N-channel thin film transistor, a voltage potential of the first power signal VSS is a constant voltage low potential. Alternatively, when the driving transistor T1 is a P-channel thin film transistor, the voltage potential of the first power signal VSS is a constant voltage high potential.

In one embodiment, the voltage stabilization unit 20 includes a voltage stabilization capacitor C1. One end of the voltage stabilization capacitor C1 is connected to the one of the source electrode and the drain electrode of the driving transistor T1, and the other end of the voltage stabilization capacitor C1 is connected to the gate electrode of the driving transistor T1.

In one embodiment, the coupling unit 30 includes a coupling capacitor C2. One end of the coupling capacitor C2 is connected to the gate electrode of the driving transistor T1.

In one embodiment, the writing unit 40 includes a writing transistor T2. One of a source electrode and a drain electrode of the writing transistor T2 is connected to the other end of the coupling capacitor C2, the other of the source electrode and the drain electrode of the writing transistor T2 is connected to the data line, and a gate electrode of the writing transistor T2 is connected to the first control line.

In one embodiment, the first power line is configured to transmit a zero voltage potential signal.

It should be noted that at least one of the driving transistor T1, the writing transistor T2, the reset transistor T4, the compensation transistor T3, and the light-emitting control transistor T5 can be, but not limited to, an N-channel thin film transistor or a P-channel thin film transistor.

At least one of the stabilization capacitor C1 and the coupling capacitor C2 can further function to store charges in the above-mentioned pixel circuit.

For a light-emitting device such as a Mini-LED or a Micro-LED, when a voltage grayscale segmentation method is used, it is difficult to accurately control a light-emitting current due to low voltages. This results in a problem of uneven brightness of low grayscale display. In order to avoid the problem of uneven brightness display caused by a low current and a threshold voltage shift caused by stress, the internal compensation pixel circuit shown in FIG. 2 combines a driving method of time-division grayscale PWM to make the light-emitting device D1 always work in a stable light-emitting phase with a large current. As such, the problem of uneven display can be improved or avoided, and a threshold voltage compensation of the driving transistor T1 can be implemented at the same time.

It should be noted that the first control line is configured to transmit a first scan signal SCAN1, the second control line is configured to transmit a second scan signal SCAN4, the third control line is configured to transmit a third scan signal SCAN2, the fourth control line is configured to transmit a fourth scan signal SCAN3, the light-emitting control line is configured to transmit a light-emitting control signal EM, and the data line is configured to transmit a data signal DATA.

Figure 3:
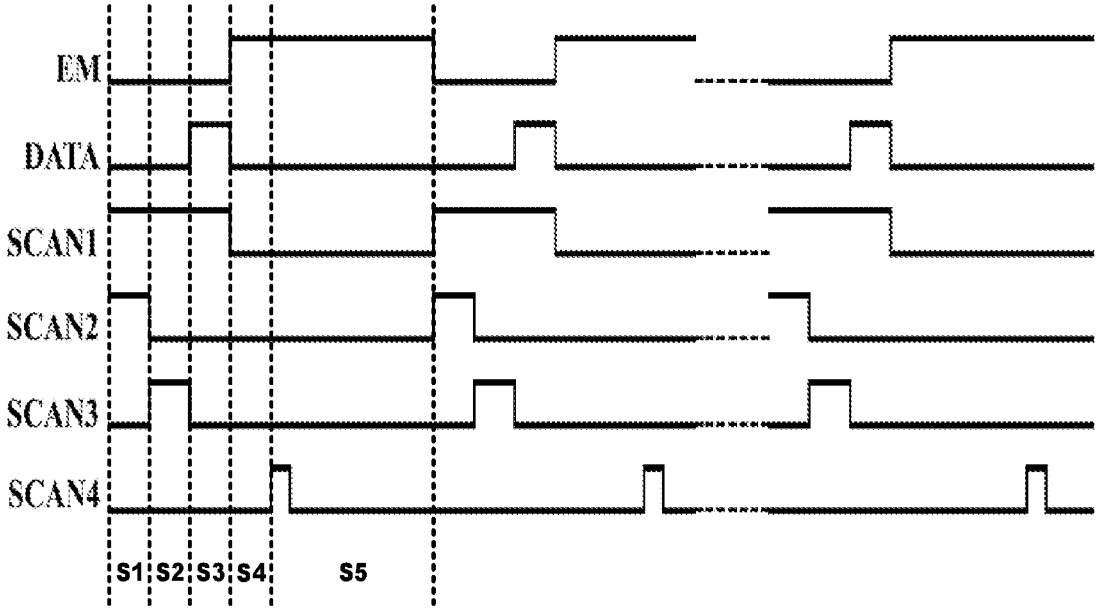
FIG. 3 illustrates a timing diagram of the pixel circuit shown in FIG. 1 or FIG. 2.

A working process of the above-mentioned pixel circuit is shown in FIG. 3 and can specifically include the following phases.

In an initialization phase S1, when the third scan signal SCAN2 is at a high voltage level, the reset transistor T4 is turned on. The second power signal VDD charges the gate electrode of the driving transistor T1, that is a point G. The source electrode of the driving transistor T1, that is, a point S, is connected to the first power signal VSS.

In a threshold voltage detection phase S2, the third scan signal SCAN2 is at a low voltage level, the reset transistor T4 is turned off. Only the first scan signal SCAN1 and the fourth scan signal SCAN3 are at a high voltage level. The writing transistor T2 and the compensation transistor T3 are turned on. At this time, a voltage of the data signal DATA is at a low voltage level, that is, DATA_L. Since a diode structure is formed and a voltage potential at the point S is the voltage potential of the first power signal VSS, a voltage potential at the point G of the driving transistor T1 drops from the voltage potential of the second power signal VDD to VSS+Vth. The driving transistor T1 is turned off. At this time, the voltage potential at the point S still maintains unchanged (at the voltage potential of the first power signal VSS).

In a writing phase S3, at this time, the fourth scan signal SCAN3 and the third scan signal SCAN2 are at a low voltage level. The compensation transistor T3 and the reset transistor T4 are turned off. The first scan signal SCAN1 is at a high voltage level. The writing transistor T2 is still turned on. The voltage of the data signal DATA changes from DATA_L to a high voltage potential, that is, DATA_H. The coupling capacitor C2 can couple the voltage potential at the point G to (DATA_H−DATA_L)*C2/(C1+C2)+VSS+Vth. At this time, the voltage potential at the point S is still the voltage potential of the first power signal VSS.

In a light-emitting phase S4, only the light-emitting control signal EM is at a high voltage level. The light-emitting control transistor T5 is turned on. The light-emitting device D1 emits light. Since Vgs−Vth=(DATA_H−DATA_L)*C2/(C1+C2) is not relevant the first power signal VSS and the threshold voltage, the threshold voltage compensation of a voltage drop (IR-drop) of the first power line and the driving transistor T1 can be implemented. Vgs is a voltage difference between the gate electrode of the driving transistor T1 and the source electrode.

In a black insertion phase S5, the second scan signal SCAN4 is at a high voltage level. The black insertion transistor T6 is turned on. The voltage potential at the point G is instantly pulled down to turn off the driving transistor T1. The light-emitting device D1 is turned off. By controlling a time point of turning on the black-insertion transistor T6, equally divided display sub-grayscales can be divided into unequally divided sub-grayscales to implement an increment of the number of the grayscales.

It should be noted that since the threshold voltage detection phases S2 and the writing phases S3 in the pixel circuits shown in FIG. 1 and FIG. 2 are completely the same, the number of the grayscales or the number of the bits in the pixel circuit shown in FIG. 2 can be greatly improved without losing a compensation range.

Figure 4:
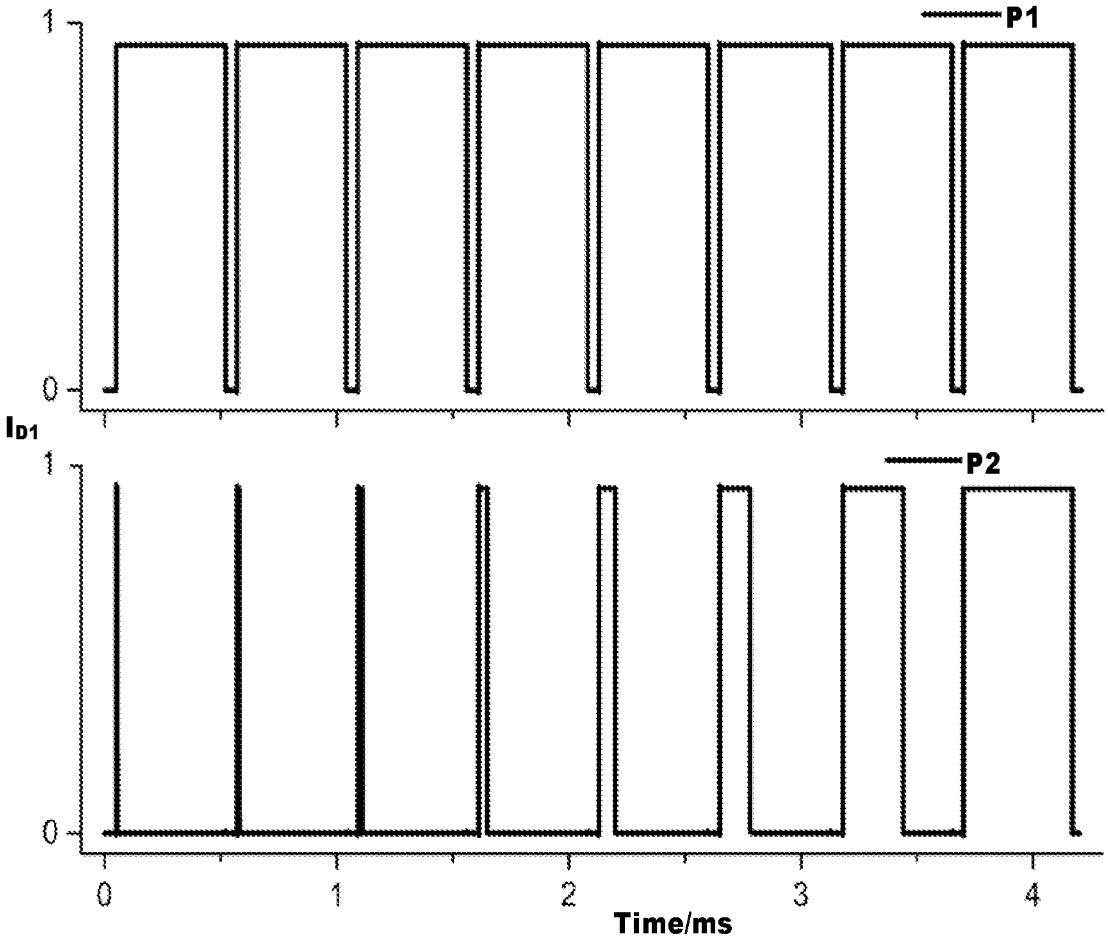
FIG. 4 illustrates a schematic diagram of a sub-field distribution comparison in the pixel circuits shown in FIG. 1 and FIG. 2.

Please refer to FIG. 4. FIG. 4 illustrates a schematic diagram of a sub-field distribution comparison in the pixel circuits shown in FIG. 1 and FIG. 2. An ordinate represents a current $I_{D1}$ flowing through the light-emitting device D1, and an abscissa represents a time Time. An upper part P1 in FIG. 4 is configured to represent the equally divided sub-field distribution in the pixel circuit shown in FIG. 1, and a lower part P2 in FIG. 4 is configured to represent the unequally divided sub-field distribution in the pixel circuit shown in FIG. 2.

It should be noted that the pixel circuit shown in FIG. 2 controls the light-emitting device D1 to be turned off by controlling the black insertion unit 50, that is, by controlling the time point of turning on the black-insertion transistor T6. Compared with 8 equally divided sub-fields in the upper part P1, 8 unequally divided sub-fields in the lower part P2 can be implemented. That is, the 8 unequally divided sub-fields can implement 256 grayscales ton exponentially increase the number of the grayscales.

One embodiment provides a display panel including a plurality of pixel circuits in at least one of the above-embodiments. The pixel circuits are distributed in a matrix in the display panel.

It can be understood that in the display panel provided by the present embodiment, the one end of the black insertion unit 50 is connected to the control end of the driving unit 10, the other end of the black insertion unit 50 is connected to the first power line, and the control end of the black insertion unit 50 is connected to the second control line. The driving unit 10 can be turned off in the plurality of different time periods in the light-emitting phase of the pixel circuit, thereby constructing a plurality of unequally divided sub-fields, which can exponentially increase a number of grayscales which can be displayed.

One embodiment provides a backlight module including a pixel circuit in at least one of the above-embodiments.

It can be understood that in the backlight module provided by the present embodiment, the one end of the black insertion unit 50 is connected to the control end of the driving unit 10, the other end of the black insertion unit 50 is connected to the first power line, and the control end of the black insertion unit 50 is connected to the second control line. The driving unit 10 can be turned off in the plurality of different time periods in the light-emitting phase of the pixel circuit, thereby constructing a plurality of unequally divided sub-fields, which can exponentially increase a number of grayscales which can be displayed.

It should be understood that those skilled in the art can make equivalent substitutions or changes according to the technical solutions and invention concepts of the present disclosure, while all these substitutions or changes shall be encompassed by the appended claims.

What is claimed is:

1. A pixel circuit, comprising:

a driving unit;

a voltage stabilization unit, one end of the voltage stabilization unit being connected to a control end of the driving unit, and the other end of the voltage stabilization unit being connected to one end of the driving unit and a first power line;

a coupling unit, and one end of the coupling unit being connected to the control end of the driving unit;

a writing unit, one end of the writing unit being connected to the other end of the coupling unit, the other end of the writing unit being connected to a data line, and a control end of the writing unit being connected to a first control line; and a black insertion unit, one end of the black insertion unit being connected to the control end of the driving unit, the other end of the black insertion unit being connected to the first power line, and a control end of the black insertion unit being connected to a second control line, wherein the black insertion unit is configured to turn off the driving unit during a plurality of different time periods in a light-emitting phase of the pixel circuit.

2. A display panel, comprising a plurality of the pixel circuits of claim 1, wherein the pixel circuits are distributed in a matrix in the display panel.

3. The display panel of claim 2, wherein the pixel circuit further comprises a reset unit, one end of the reset unit is connected to the control end of the driving unit, the other end of the reset unit is connected to a second power line, and a control end of the reset unit is connected to a third control line.

4. The display panel of claim 3, wherein the pixel circuit further comprises:

a light-emitting unit, and one end of the light-emitting unit being connected to the second power line;

a light-emitting control unit, one end of the light-emitting control unit being connected to the other end of the light-emitting unit, the other end of the light-emitting control unit being connected to the other end of the driving unit, and a control end of the light-emitting control unit being connected to a light-emitting control line; and a compensation unit, one end of the compensation unit being connected to the other end of the driving unit, the other end of the compensation unit being connected to the control end of the driving unit, and the control end of the compensation unit being connected to a fourth control line.

5. The display panel of claim 4, wherein the light-emitting unit comprises at least one light-emitting device, and an anode of the at least one light-emitting device is connected to the second power line;

the light-emitting control unit comprises a light-emitting control transistor, one of a source electrode and a drain electrode of the light-emitting control transistor is connected to a cathode of the at least one light-emitting device, and the other of the source electrode and the drain electrode of the light-emitting control transistor is connected to the other end of the driving unit; and the compensation unit comprises a compensation transistor, one of a source electrode and a drain electrode of the compensation transistor is connected to the one end of the reset unit, the other of the source electrode and the drain electrode of the compensation transistor is connected to the other of the source electrode and the drain electrode of the light-emitting control transistor, and a gate electrode of the compensation transistor is connected to the fourth control line.

6. The display panel of claim 3, wherein the reset unit comprises a reset transistor, one of a source electrode and a drain electrode of the reset transistor is connected to the control end of the driving unit, the other of the source electrode and the drain electrode of the reset transistor is connected to the second power line, and a gate electrode of the reset transistor is connected to the third control line.

7. The display panel of claim 3, wherein the first power line is configured to transmit a first power signal, the second power line is configured to transmit a second power signal, and a voltage potential of the first power signal is lower than a voltage potential of the second power signal.

8. The display panel of claim 2, wherein the black insertion unit comprises a black insertion transistor, one of a source electrode and a drain electrode of the black insertion transistor is connected to the control end of the driving unit, the other of the source electrode and the drain electrode of the black insertion transistor is connected to the first power line, and a gate electrode of the black insertion transistor is connected to the second control line.

9. The display panel of claim 8, wherein the driving unit comprises a driving transistor, a gate electrode of the driving transistor is connected to the one of the source electrode and the drain electrode of the black insertion transistor, the one end of the voltage stabilization unit, and the one end of the coupling unit, and one of a source electrode and a drain electrode of the driving transistor is connected to the first power line; and the first power line is configured to transmit a first power signal; when the driving transistor is an N-channel thin film transistor, a voltage potential of the first power signal is a constant voltage low potential; or, when the driving transistor is a P-channel thin film transistor, the voltage potential of the first power signal is a constant voltage high potential.

10. The display panel of claim 9, wherein the voltage stabilization unit comprises a voltage stabilization capacitor, one end of the voltage stabilization capacitor is connected to the one of the source electrode and the drain electrode of the driving transistor, and the other end of the voltage stabilization capacitor is connected to the gate electrode of the driving transistor;

the coupling unit comprises a coupling capacitor, and one end of the coupling capacitor is connected to the gate electrode of the driving transistor; and the writing unit comprises a writing transistor, one of a source electrode and a drain electrode of the writing transistor is connected to the other end of the coupling capacitor, the other of the source electrode and the drain electrode of the writing transistor is connected to the data line, and a gate electrode of the writing transistor is connected to the first control line.

11. The pixel circuit of claim 1, wherein the pixel circuit further comprises a reset unit, one end of the reset unit is connected to the control end of the driving unit, the other end of the reset unit is connected to a second power line, and a control end of the reset unit is connected to a third control line.

12. The pixel circuit of claim 11, wherein the pixel circuit further comprises:

a light-emitting unit, and one end of the light-emitting unit being connected to the second power line;

a light-emitting control unit, one end of the light-emitting control unit being connected to the other end of the light-emitting unit, the other end of the light-emitting control unit being connected to the other end of the driving unit, and a control end of the light-emitting control unit being connected to a light-emitting control line; and a compensation unit, one end of the compensation unit being connected to the other end of the driving unit, the other end of the compensation unit being connected to the control end of the driving unit, and a control end of the compensation unit being connected to a fourth control line.

13. The pixel circuit of claim 12, wherein the light-emitting unit comprises at least one light-emitting device, and an anode of the at least one light-emitting device is connected to the second power line;

the light-emitting control unit comprises a light-emitting control transistor, one of a source electrode and a drain electrode of the light-emitting control transistor is connected to a cathode of the at least one light-emitting device, and the other of the source electrode and the drain electrode of the light-emitting control transistor is connected to the other end of the driving unit; and the compensation unit comprises a compensation transistor, one of a source electrode and a drain electrode of the compensation transistor is connected to the one end of the reset unit, the other of the source electrode and the drain electrode of the compensation transistor is connected to the other of the source electrode and the drain electrode of the light-emitting control transistor, and a gate electrode of the compensation transistor is connected to the fourth control line.

14. The pixel circuit of claim 11, wherein the reset unit comprises a reset transistor, one of a source electrode and a drain electrode of the reset transistor is connected to the control end of the driving unit, the other of the source electrode and the drain electrode of the reset transistor is connected to the second power line, and a gate electrode of the reset transistor is connected to the third control line.

15. The pixel circuit of claim 11, wherein the first power line is configured to transmit a first power signal, the second power line is configured to transmit a second power signal, and a voltage potential of the first power signal is lower than a voltage potential of the second power signal.

16. The pixel circuit of claim 1, wherein the black insertion unit comprises a black insertion transistor, one of a source electrode and a drain electrode of the black insertion transistor is connected to the control end of the driving unit, the other of the source electrode and the drain electrode of the black insertion transistor is connected to the first power line, and a gate electrode of the black insertion transistor is connected to the second control line.

17. The pixel circuit of claim 16, wherein the driving unit comprises a driving transistor, a gate electrode of the driving transistor is connected to the one of the source electrode and the drain electrode of the black insertion transistor, the one end of the voltage stabilization unit, and the one end of the coupling unit, and one of a source electrode and a drain electrode of the driving transistor is connected to the first power line; and the first power line is configured to transmit a first power signal; when the driving transistor is an N-channel thin film transistor, a voltage potential of the first power signal is a constant voltage low potential; or, when the driving transistor is a P-channel thin film transistor, the voltage potential of the first power signal is a constant voltage high potential.

18. The pixel circuit of claim 17, wherein the voltage stabilization unit comprises a voltage stabilization capacitor, one end of the voltage stabilization capacitor is connected to the one of the source electrode and the drain electrode of the driving transistor, and the other end of the voltage stabilization capacitor is connected to the gate electrode of the driving transistor;

the coupling unit comprises a coupling capacitor, and one end of the coupling capacitor is connected to the gate electrode of the driving transistor; and the writing unit comprises a writing transistor, one of a source electrode and a drain electrode of the writing transistor is connected to the other end of the coupling capacitor, the other of the source electrode and the drain electrode of the writing transistor is connected to the data line, and a gate electrode of the writing transistor is connected to the first control line.

19. The pixel circuit of claim 1, wherein the first power line is configured to transmit a zero voltage potential signal.

20. A backlight module, comprising the pixel circuit of claim 1.

* * * * *